(No Model.)
F. W. HUBBARD.
WHEEL.
No. 354,474. Patented Dec. 14, 1886.
FIG. I.
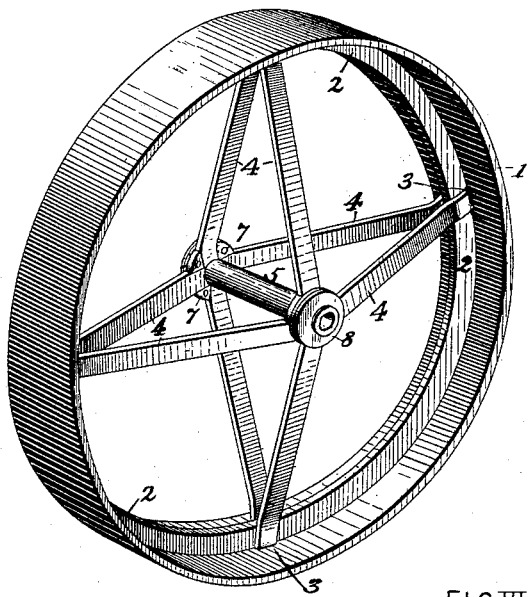
FIG. III.
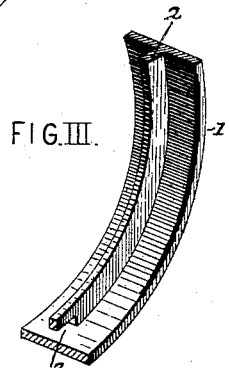
FIG. II.
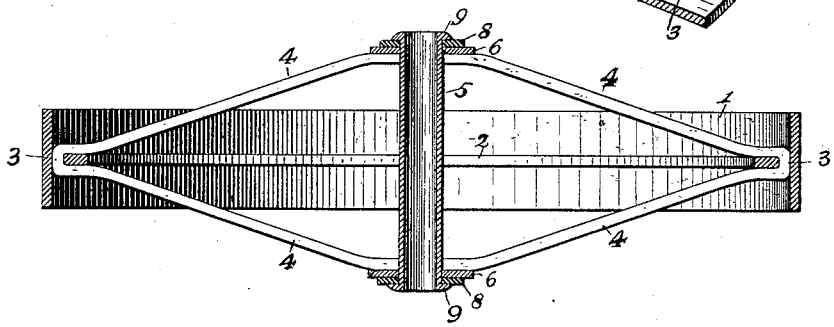
ATTEST-
J. Henry Kaiser
Harry L. Amer
INVENTOR-
Fred W. Hubbard
By Knight Bros.
Attorneys
N. PETERS, Photo-Lithographer, Washington, D. C.

UNITED STATES PATENT OFFICE.

FRED W. HUBBARD, OF COLUMBUS, OHIO, ASSIGNOR TO THE KILBOURNE & JACOBS MANUFACTURING COMPANY, OF SAME PLACE.

WHEEL.

SPECIFICATION forming part of Letters Patent No. 354,474, dated December 14, 1886.

Application filed March 22, 1886. Serial No. 196,154. (No model.)

*To all whom it may concern:*

Be it known that I, FRED W. HUBBARD, a citizen of the United States, residing at Columbus, in the county of Franklin and State of Ohio, have invented a new and useful Improvement in Wheels, of which the following is a specification.

It is common to construct tension-spoke wheels with rims of T section, the flat face constituting the tire and the inwardly-projecting web or flange serving for the attachment of the spokes. I have devised a mode of constructing wheels well adapted for wheelbarrows and for various other descriptions of wheels, economical in manufacture and strong and durable in use, by employing a rim of T iron or steel and spokes of bar-steel passed through slots in the web or flange close to the flat rim, tightly set to the said rim or flange and spread at the hub, box, or axle, to impart strength and stiffness; but instead of tying the spokes to the hub or axle, as is necessary with tension-spokes, I bring the meeting extremities of all the spokes together in one plane near one end of the axle or box, and their other extremities in another plane near the other end of the axle or box, so that they mutually support each other, and fasten them securely by suitable collars or the like on the box or the axle outside the combined spoke ends, to keep them from spreading. The wheel may be made either with or without a hub. The spoke ends, fitting closely around a solid or tubular axle or box, as the case may be, mutually brace and key each other.

In carrying out my invention I construct the tire of the wheel of a bar of T iron or steel bent into a circle and suitably welded, and with the web forming a flange on the inside. In this web, close to the outer rim forming the flat periphery of the wheel, I punch oblong holes, into which are slipped spokes of bar-steel, preferably flat. If the wheel is to have a hub or box, a piece of gas-pipe having one end flanged is used for a spindle or box. One part or member of the hub, consisting of an annular disk, to one face of which are riveted triangular pieces equal in number to the spokes and adapted to fill the spaces between the ends of the spokes, is then slipped on the tubular spindle against the flanged end thereof, a washer being preferably interposed between the said hub end and the flanged end of the tubular spindle. The spokes, having been suitably bent, are then set in their slots in the rim, tightly clamping the web within the bent extremity of each duplex spoke. The other piece of the hub, similar to the first, is then placed over the free end of the tubular spindle and forced down over the remaining inner ends of the spoke-irons with sufficient pressure to make everything tight, after which an additional washer may be slipped over the tubular spindle and the latter is upset or flanged, holding everything securely.

If preferred, the wheel may have a wrought or malleable iron hub, in which the spokes are fitted so as to hold them all securely in place; or the hub-pieces by which the inner ends of the spokes are keyed apart may be dispensed with, the spokes being securely braced by their contact around the hollow spindle or box of the wheel and secured longitudinally by simple collars or washers.

In order that the invention may be more fully understood, I will proceed to describe it with reference to the accompanying drawings, in which—

Figure I is a perspective view of a wheel made in accordance with my invention. Fig. II is a section, on a larger scale, in the plane of the spindle, cutting through two of the spoke-slots in the flange of the rim, but showing the duplex spokes in elevation. Fig. III is a perspective view of a part of the rim.

1 is a flat or cylindrical rim constituting the outer periphery of the wheel, and 2 the flange or web formed in one piece therewith and pierced with slots 3 for the reception of the spokes 4.

5 represents the tubular spindle or box of the wheel, and 6 6 the hub ends, having key-pieces 7 filling the spaces between the inner extremities of the spoke-irons 4.

8 8 represent washers or collars, which form longitudinal bearings for the inner ends of the spokes 4 and confine them between the flanged ends 9 of the spindle. The hub ends 6 7 may be fixed to the washers or collars 8, or they may be dispensed with altogether, especially on the smaller class of wheels, the contact of the spoke ends serving to brace them circumferentially on the spindle or box of the wheel, while the washers or collars 8 secure them longitudinally.

My improved wheel possesses great strength, while it is remarkably cheap both in material and workmanship. It is put together with great facility by means of suitable machinery, and dispenses with the need of bolts and rivets.

Having thus described my invention, the following is what I claim as new therein and desire to secure by Letters Patent:

1. A vehicle-wheel having a flanged or T-rail tire and spokes passed through slots therein, the several ends of the respective spokes abutting against and meeting around the hub, box, or axle, and secured against spreading by collars or flanges surrounding said hub, box, or axle on the outside of the spoke ends, as explained.

2. The combination of the flanged or T-iron rim 1 2, rigid spokes 4, passing through slots 3 and set to the flange 2, an axle or box, 5, against which the ends of the spokes bear, and suitable keys, 6 7, and flanges or collars 9 for securing them, substantially as set forth.

3. A wheel having a flanged or T-rail tire, duplex spokes secured thereto, and a tubular hub or spindle flanged at its ends to confine the inner ends of the spokes, substantially as herein shown and described.

FRED W. HUBBARD.

Witnesses:
T. M. LIVESAY,
W. T. McCLURE.